United States Patent [19]

Stefansson et al.

[11] Patent Number: 5,327,307
[45] Date of Patent: Jul. 5, 1994

[54] MAGNETIC TAPE CASSETTE RECORDER HAVING A SLIDABLY AND TILTABLY MOUNTED CASSETTE HOLDER AND A LATCH INTERLOCK MECHANISM

[75] Inventors: Rafn Stefansson, San Marino; Merle Westover, Pasadena, both of Calif.

[73] Assignee: Datatape Incorporated, Pasadena, Calif.

[21] Appl. No.: 870,385

[22] Filed: Apr. 17, 1992

[51] Int. Cl.⁵ .................... G11B 15/675; G11B 15/66
[52] U.S. Cl. .................... 360/96.5; 360/96.6; 360/95
[58] Field of Search .......... 360/96.6, 96.5, 71, 360/69, 137, 95

[56] References Cited

U.S. PATENT DOCUMENTS

| | | | |
|---|---|---|---|
| 3,867,722 | 2/1975 | Syohji | 360/96.6 |
| 4,017,900 | 4/1977 | Katsurayana | 360/96.6 |
| 4,138,701 | 2/1979 | Suzuki | 360/96.5 |
| 4,152,738 | 5/1979 | Shimizu et al. | 360/95 |
| 4,301,484 | 11/1981 | Sawaguchi et al. | 360/96.6 |
| 4,302,788 | 11/1981 | Yamamoto | 360/96.6 |
| 4,706,141 | 11/1987 | Oba et al. | 360/96.6 |

FOREIGN PATENT DOCUMENTS 067829  8/1979  U.S.S.R. ............... 360/96.6

*Primary Examiner*—John H. Wolff
*Assistant Examiner*—Craig A. Renner
*Attorney, Agent, or Firm*—William F. Noval

[57] ABSTRACT

A magnetic tape cassette recording/reproducing apparatus includes a magnetic tape cassette loader which allows easy insertion and removal of a cassette relative to the apparatus and which positively locks the cassette within the apparatus during recording and reproducing operations. The magnetic tape cassette loader includes a cassette holder that is tiltable and slidable relative to the recorder to permit easy insertion and removal of a cassette therein; a handle and latch assembly for handling and latching the cassette holder in the recorder; and an interlock mechanism for locking and unlocking the latch mechanism in response to actuation by a magnetic tape threading apparatus.

5 Claims, 17 Drawing Sheets

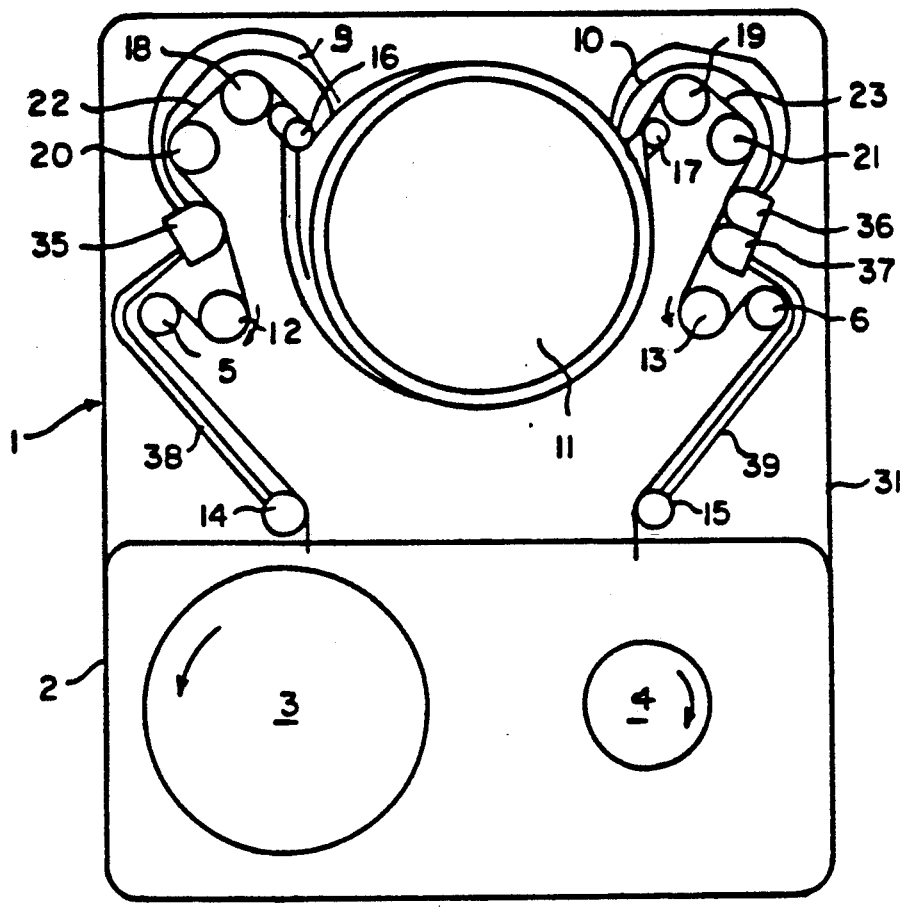
FIG. 3
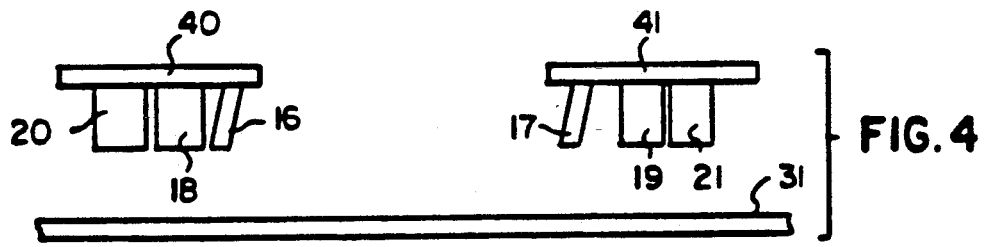
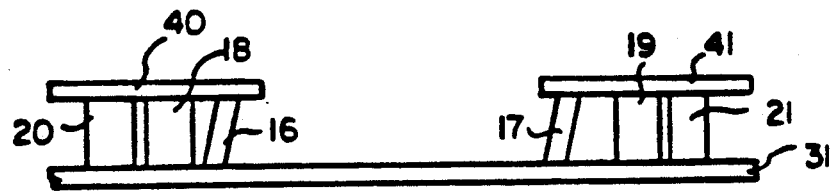
FIG. 5

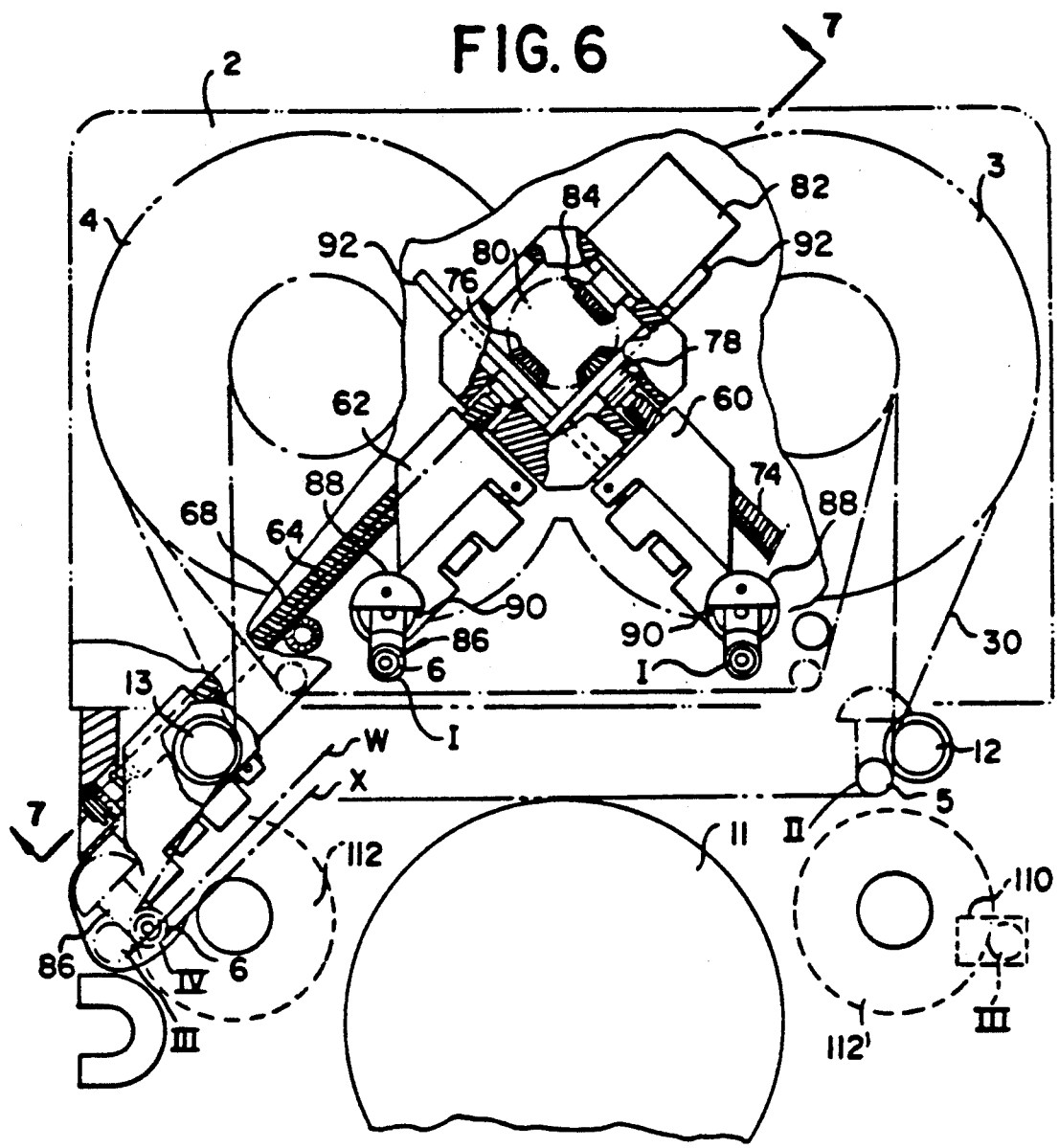

MAGNETIC TAPE CASSETTE RECORDER HAVING A SLIDABLY AND TILTABLY MOUNTED CASSETTE HOLDER AND A LATCH INTERLOCK MECHANISM

FIELD OF INVENTION

This invention relates in general to a magnetic tape recording and reproducing apparatus and more particularly to a magnetic tape cassette loader and interlock mechanism for use in a helical scan magnetic tape recording/reproducing apparatus.

BACKGROUND OF THE INVENTION

Magnetic tape recording/reproducing systems are widely used to record and reproduce analog and digital audio and video information and digital data information. The magnetic tape is usually stored on a reel or reels which typically are contained in a two reel cassette. The cassette is adapted to be inserted into and removed from a magnetic tape recording/reproducing apparatus, such as a helical scan magnetic tape recorder. In such case, it is desirable that the cassette be easily inserted or removed from the recorder. At the same time it is desirable that the cassette be locked in position during recording and reproducing, since during these operations, magnetic tape is removed from the cassette and transported along a path past rotating magnetic heads of the helical scan recorder. If the tape cassette is not locked during such operations, movement of the cassette can damage or destroy the tape, resulting in loss and destruction of the data recorded on the tape.

SUMMARY OF THE INVENTION

According to the present invention there is provided in magnetic tape cassette recording/reproducing apparatus, a magnetic tape cassette loader which allows easy insertion and removal of a cassette relative to the apparatus and which positively locks the cassette within the apparatus during recording and reproducing operations. According to an aspect of the present invention, a magnetic tape cassette loader includes a cassette holder that is tiltable and slidable relative to the recorder to permit easy insertion and removal of a cassette therein; a handle and latch assembly for handling and latching the cassette holder in the recorder; and an interlock mechanism for locking and unlocking the latch mechanism in response to actuation by a magnetic tape threading apparatus.

BRIEF DESCRIPTION OF THE DRAWINGS

FIGS. 1, 2, and 3 are respective diagrammatic plan views of a helical scan magnetic tape recorder incorporating an embodiment of the present invention.

FIGS. 4 and 5 are elevational views useful in describing the moveable guide elements of the apparatus of FIG. 1.

FIGS. 6 and 7 are respective diagrammatic plan and sectional, elevational views of magnetic tape threading and compliance element guiding apparatus.

DESCRIPTION OF THE PREFERRED EMBODIMENTS

Figure 1:
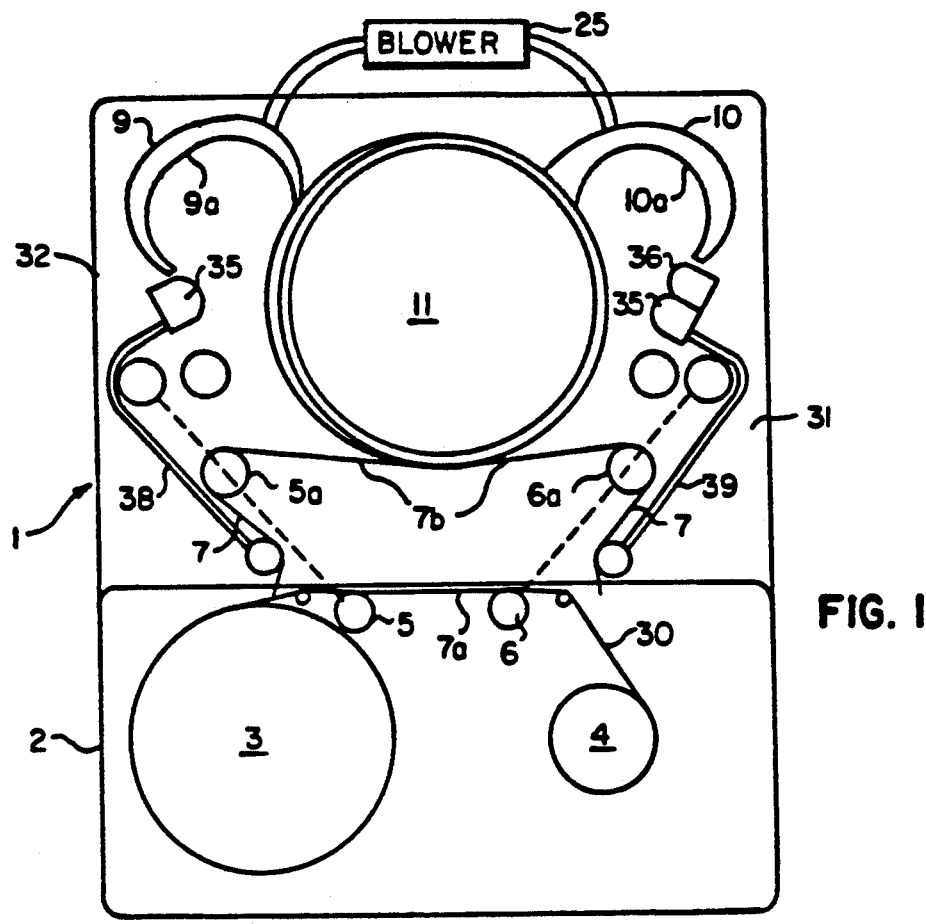
Figure 2:
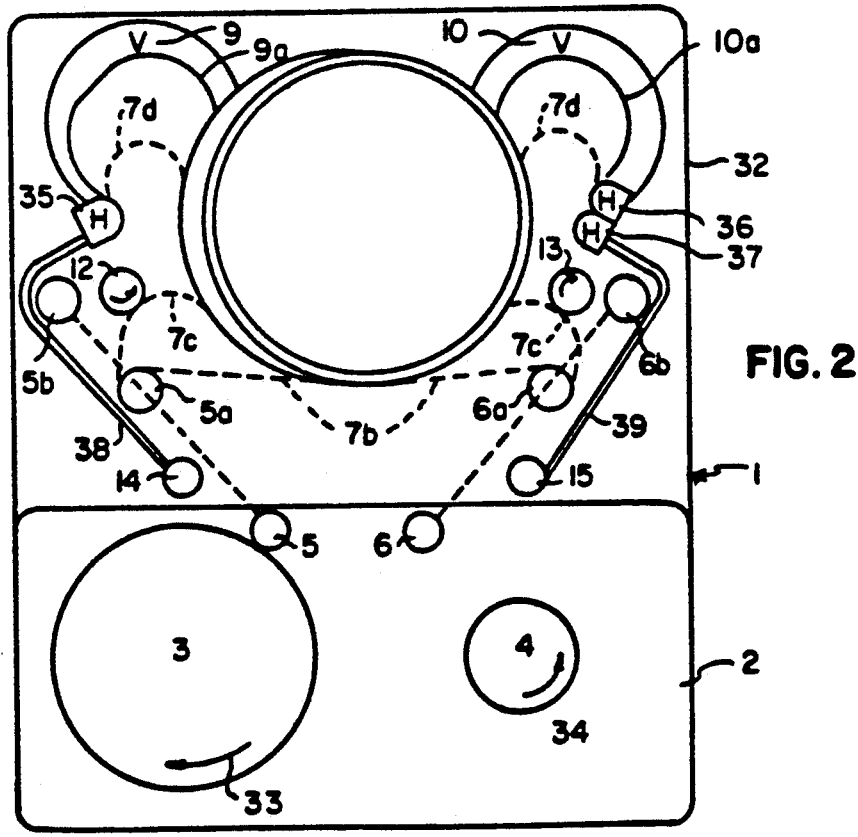
Figure 8:
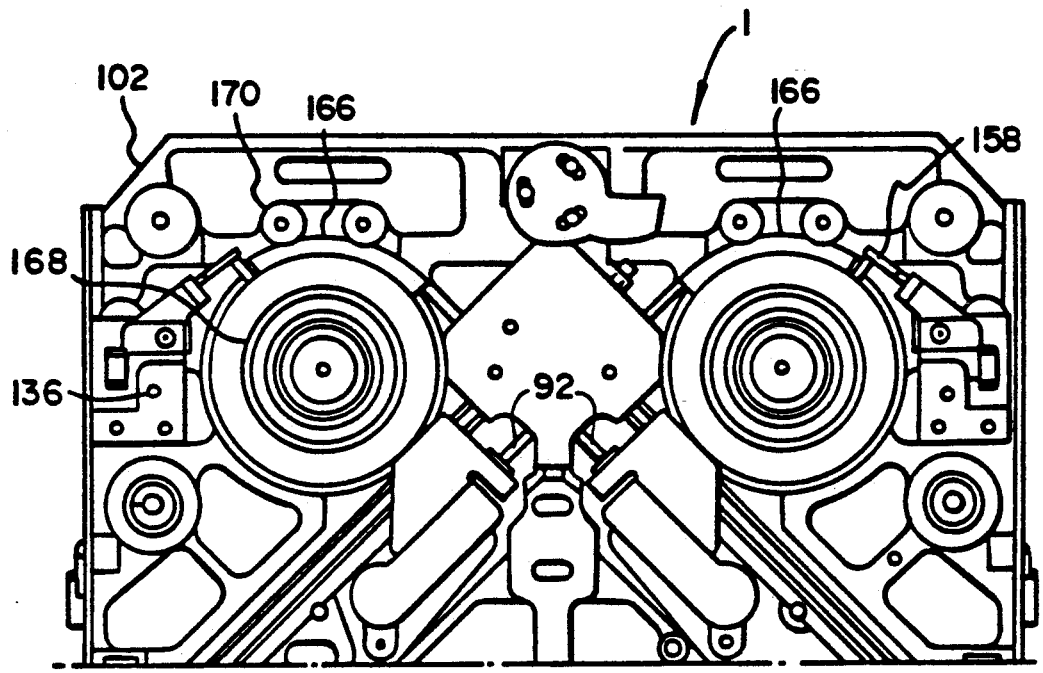
FIGS. 8, 9, 10 and 11 are respective diagrammatic back plan, side sectional, front plan, and side elevational views of the recorder of FIG. 1.
Figure 9:
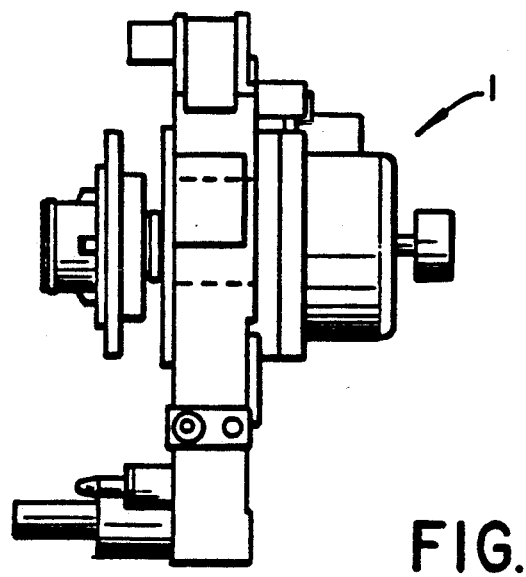
Figure 10:
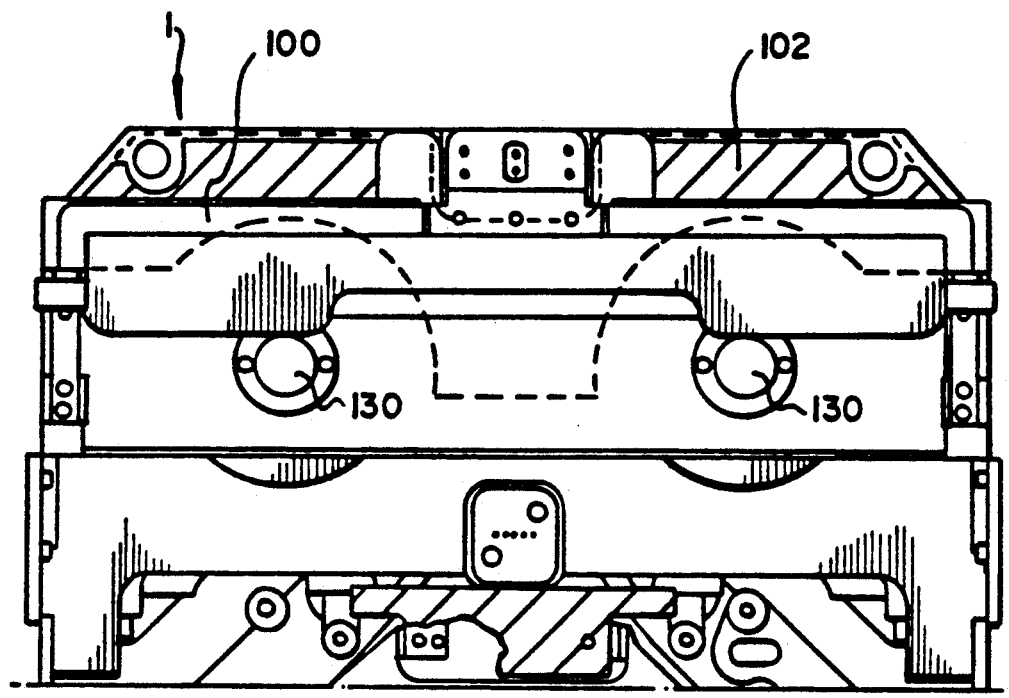
Figure 11:
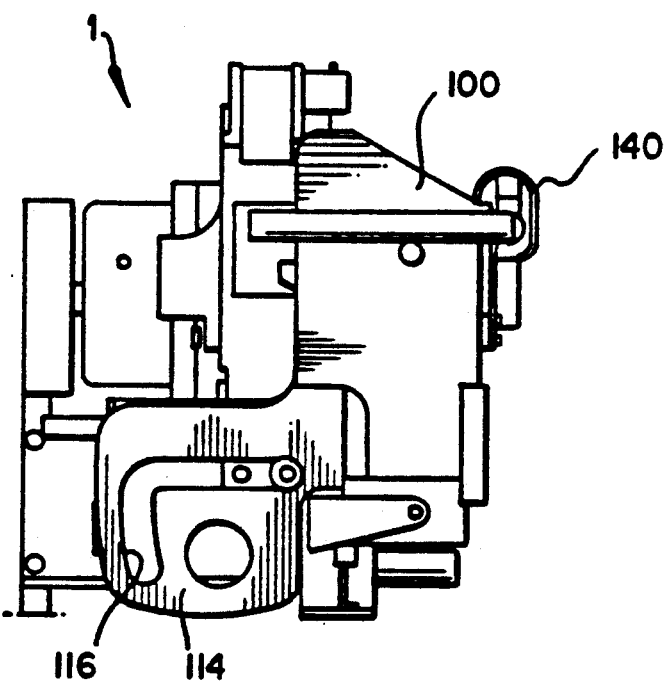

Referring now to the Figures, there will be described an embodiment of the present invention as used in a helical scan magnetic tape recording and/or reproducing apparatus. As shown in FIGS. 1-3, a helical scan magnetic tape recorder 1 receives magnetic tape cassette 2. Cassette 2 contains reels 3 and 4 which hold magnetic tape 30 and are rotatable in the directions 33, 34. Rollers 5 and 6 are a part of the tape transport 1 and are so located that when the cassette 2 is installed on transport 1, the tape strand 7a from tape reel 3 to tape reel 4 comes in front of rollers 5 and 6. When cassette 2 is loaded and locked in place, rollers 5 and 6 are driven to positions 5a and 6a by a mechanism described later. Tape 30 is withdrawn from the cassette 2 to a position shown by the tape strand 7b around guides 14 and 15 (tape strands 7 extend between guides 14 and 15 and rollers 5, 6 at positions 5a, 6a). The space on the transport 1 traversed by the tape 30 is surrounded by a floor 31, a covering and a surrounding wall 32. Vacuum cavities 9 and 10 are located contiguous to and on opposite sides of rotary head scanner 11. A blower 25 vents cavities 9 and 10 to create a vacuum which draws air through respective perforated walls 9a and 10a.

When the tape 30 has been pulled by rollers 5 and 6 to positions 5a and 6a and the tape 30 is in position 7b against scanner 11 the vacuum blower is turned on and reels 3 and 4 are driven in an unspooling direction. The vacuum created by cavities 9 and 10 draws tape 30 into position 7c about scanner 11 and capstans 12 and 13. Tape 30 is drawn to position 7d and ultimately into contact with walls 9a and 10a (FIG. 2 ), into contact with fixed heads (H, FIG. 2) 35, 36, 37, and around scanner 11. Simultaneously, rollers 5, 6 move to the position represented by 5b, 6b. The vacuum enclosure includes curved walls 9a and 10a and additional walls 38 and 39.

Within the vacuum cavities 9 and 10, there are optical sensors to sense when tape 30 is completely in position against walls 9a and 10a. When this is verified, elevators 40 and 41 (FIGS. 4 and 5) are actuated to lower guide posts 16 and 17, entry roller 18, exit roller 19, and rollers 20 and 21. Vacuum blower 25 is then turned off, the tape is tensioned by rotating reels 3 and 4 and capstans 12 and 13, and tape segments 22 and 23 are tightened around guiding elements 16–21.

A tape threading and guiding apparatus is shown in FIGS. 6 and 7. As shown in FIG. 6, compliance rollers 5 and 6 are respectively mounted on carriages 60 and 62. Carriage 62 rides on rails 64 and 66 (FIG. 7) and is driven in opposite directions by threaded shaft 68 which is threaded through nut 70. Nut 70 is held from turning in carriage 62 by "D" hole 72. Similarly, carriage 60 is driven in opposite directions by a threaded shaft 74 threaded through a nut held in carriage 60. The driving ends of shafts 68 and 74 have respective pinion gears 76 and 78 which engage bevel gear 80 driven by motor 82 through pinion gear 84.

Compliance rollers 5 and 6 are moved between (1) a cassette loading position I in which rollers 5, 6 are positioned behind a span of magnetic tape in cassette 2; (2) a tape vacuum loading position II in which rollers 5, 6 have drawn tape out of cassette 2, and have partially wrapped tape 30 around rotary head scanner 11; and (3) a position in which rollers 5, 6 draw tape 30 around capstans 12 and 13.

Compliance roller 6 is mounted on an arm 86. Arm 86 is biased by a spring which loads weight 88 against stop pin 90. As will be described in greater detail later, when the compliance arm carriage 62, 60 is in the cassette loading position I, it will actuate shafts 92 which unlock the cassette loader to allow unloading and loading of a cassette into recorder 1.

Referring now to FIGS. 8-11, there is shown recorder 1 including an embodiment of cassette loading and interlocking assembly according to the present invention. As shown, cassette loader 100 is mounted on one side of recorder frame 102. Loader 100 functions (1) to permit easy manual insertion and removal of a cassette relative to recorder 1; (2) to engage the cassette tape reels with driving mechanisms on the recorder 1; and (3) to lock the cassette into recorder 1 during recording and reproducing to prevent damage to the tape. Loader 100 is more clearly described with reference to FIGS. 12-26.

Figure 12:
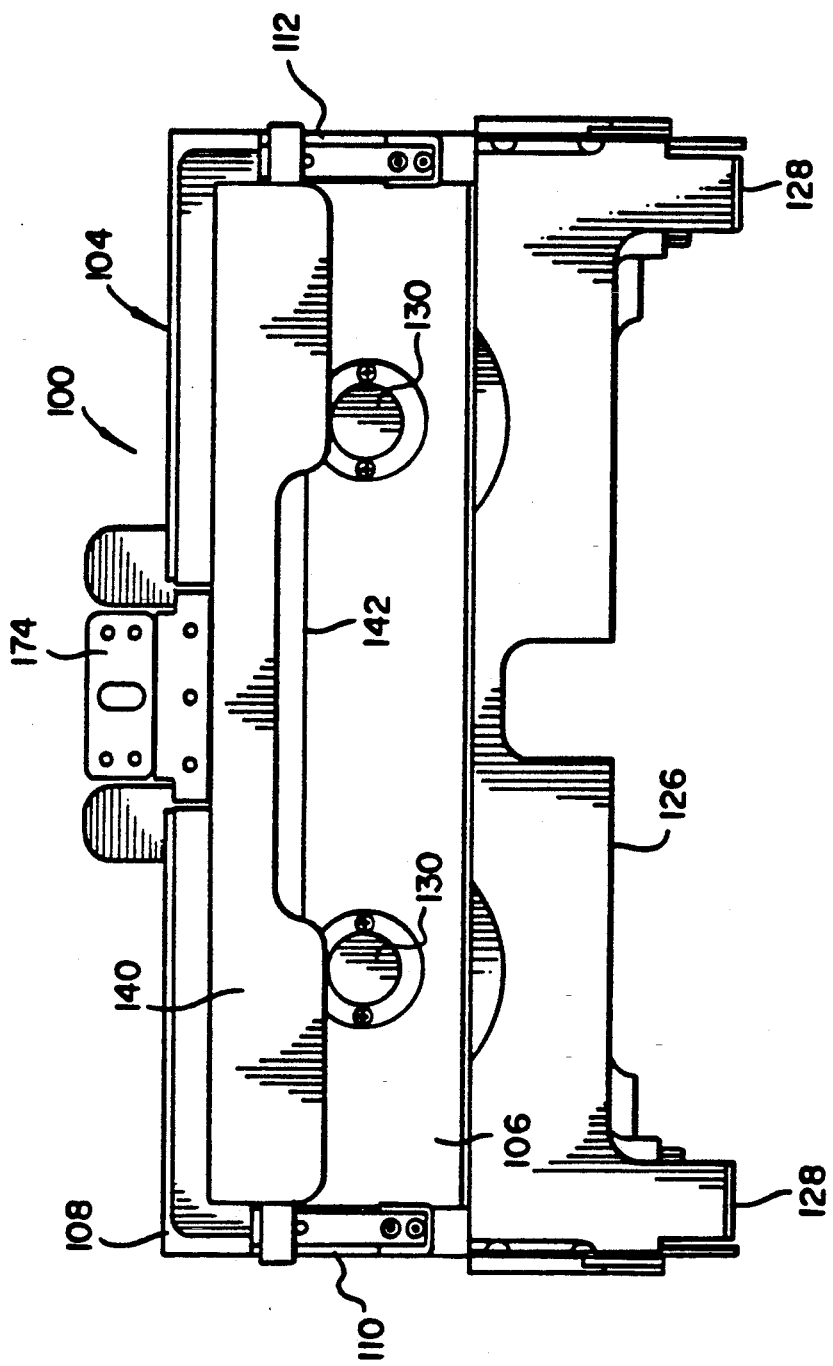
FIGS. 12, 13, and 14 are respective front elevational, side elevational, and bottom plan views of an embodiment of cassette loader of the present invention.
Figure 13:
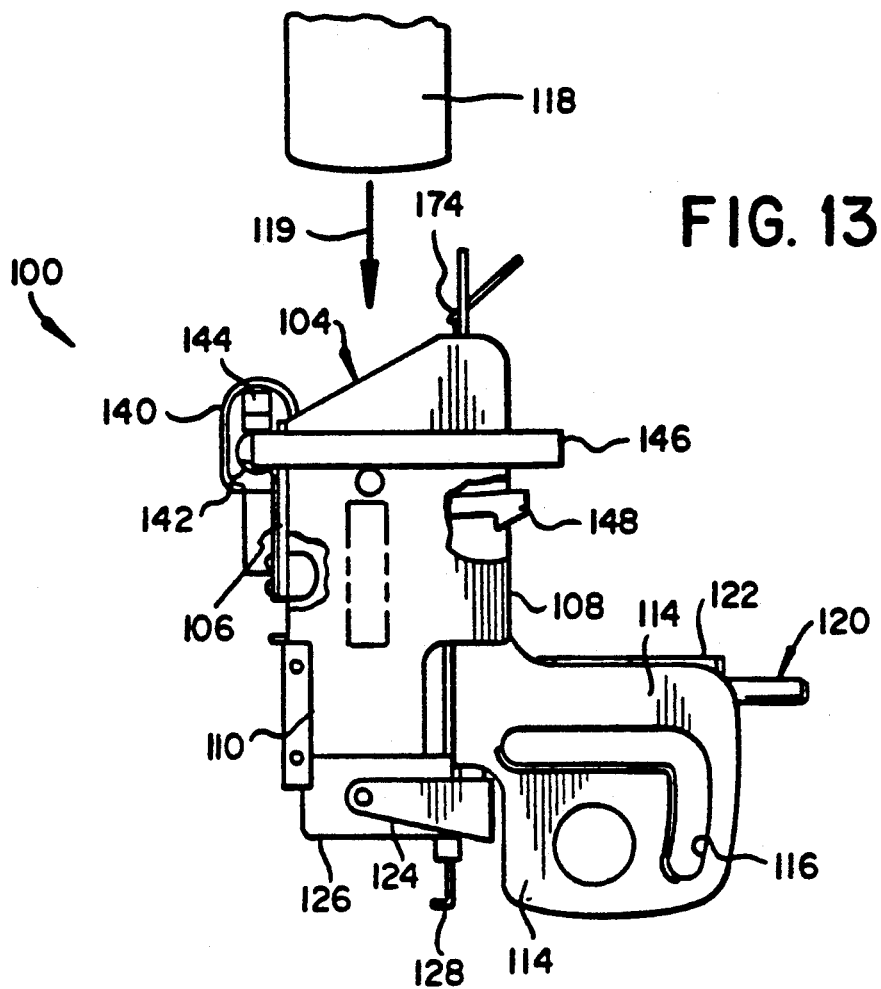
Figure 14:
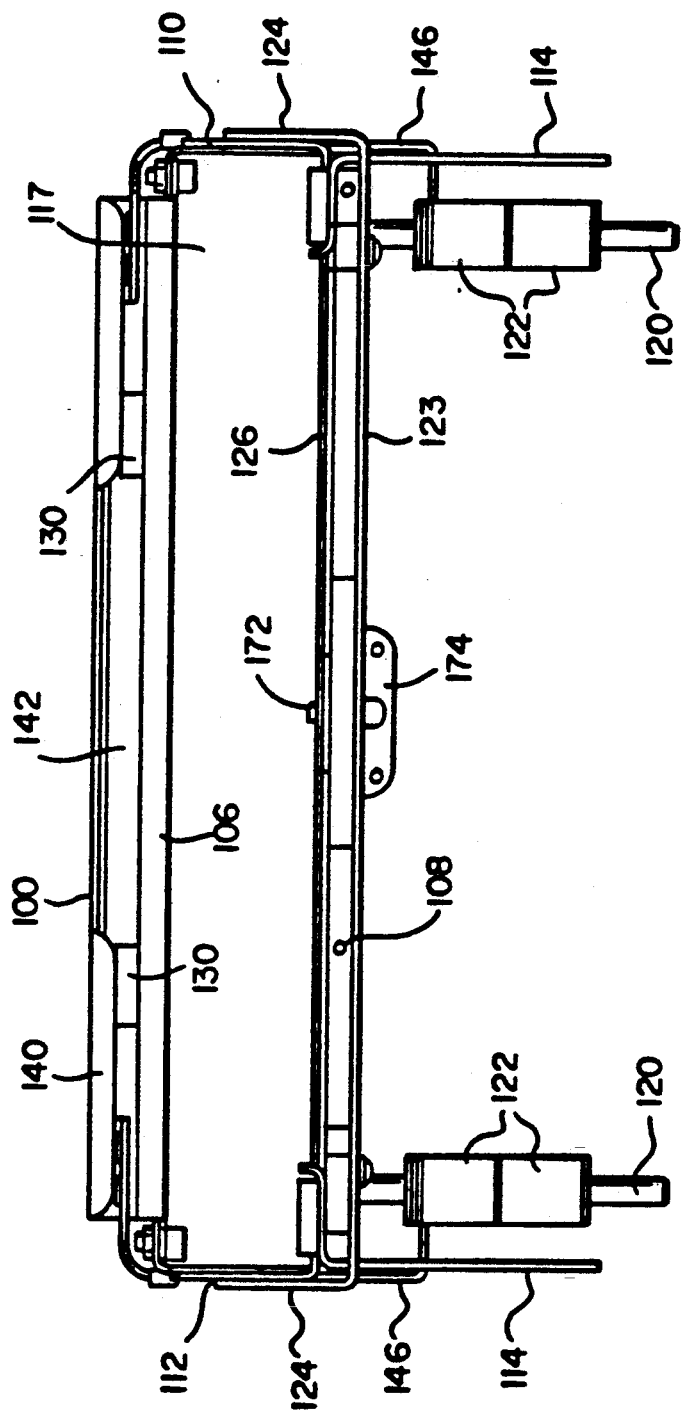

As shown in FIGS. 12-14, loader 100 includes cassette holding body 104 including front and back members 106 and 108 and side members 110 and 112 having extensions 114 with L-shaped cam grooves 116. Members 106, 108, 110, and 112 form a rectangular pocket 117 dimensioned to receive a magnetic tape cassette 118 loaded in the direction of arrow 119. Loader 100 has shafts 120 which ride in bearings 122 mounted on recorder frame 102 to effect sliding of loader 100 into and out of recorder 1. Cam grooves 116 limit the straight in and out travel of cassette loader 100 and also serve to sequence the translatory and rotational motions of loader 100.

Shafts 120 are mounted to member 123 having laterally extending arms 124. Arms 124 are attached to a cassette slide 126 slidably mounted on the inside of member 108. As will be described later, when the cassette holding body 104 is tilted outwardly, arms 124 lift slide 126 relative to body 104 and carry cassette stop 128 on slide 126 upwardly to partially lift cassette 118 to provide easier gripping and manual removal and insertion.

Figure 15:
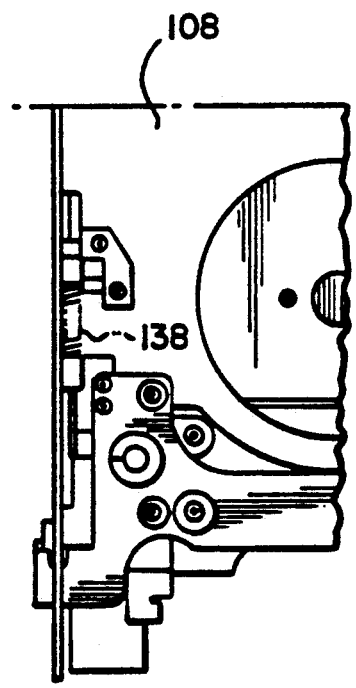
FIGS. 15, 16, and 17 are detailed views of the embodiment of FIG. 12.
Figure 16:
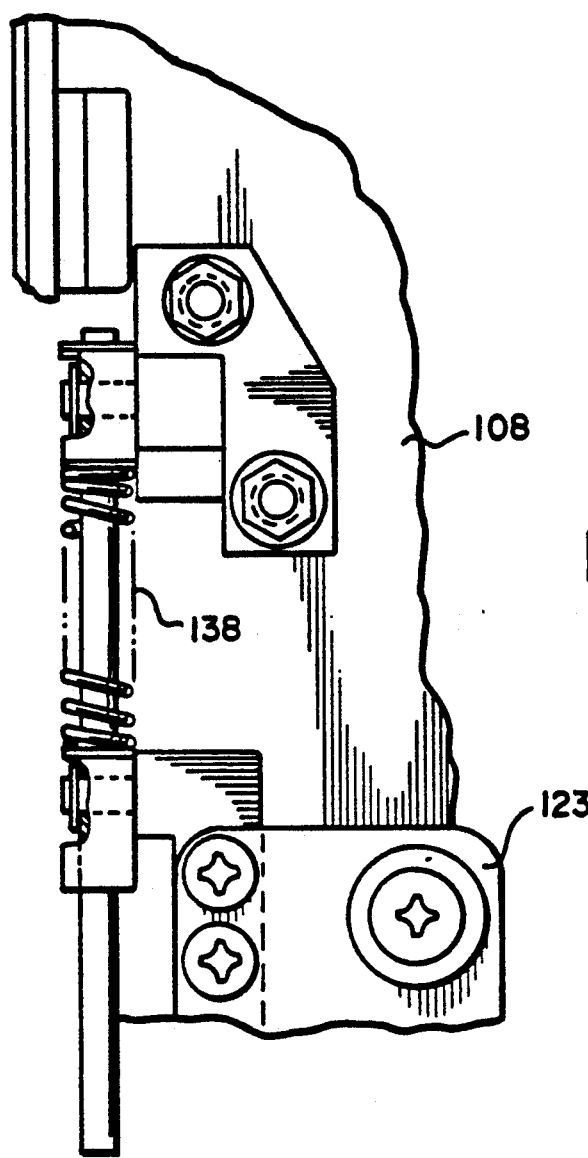

As shown in FIGS. 15 and 16, over-center spring mechanisms 138 link member 108 of body 104 and member 123. Spring mechanisms 138 cause tiltable cassette holding body 104 to tend to stay in either the tilted or straight up position. This feature is desirable because of the limited access in some recorder applications and the need to insert and remove cassettes with one hand.

Figure 17:
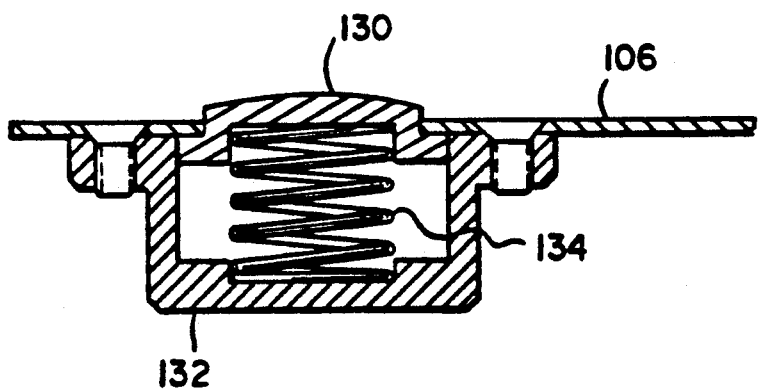

As shown in FIG. 17, member 106 is provided with buttons 130 slidably mounted in wells 132 and biased by springs 134. Buttons 130 press against the reels of a loaded cassette 118 to hold the reels in firm engagement with reel drive hubs 136 (FIG. 9) and prevent axial movement of the reels in vibration or shock.

Figure 18:
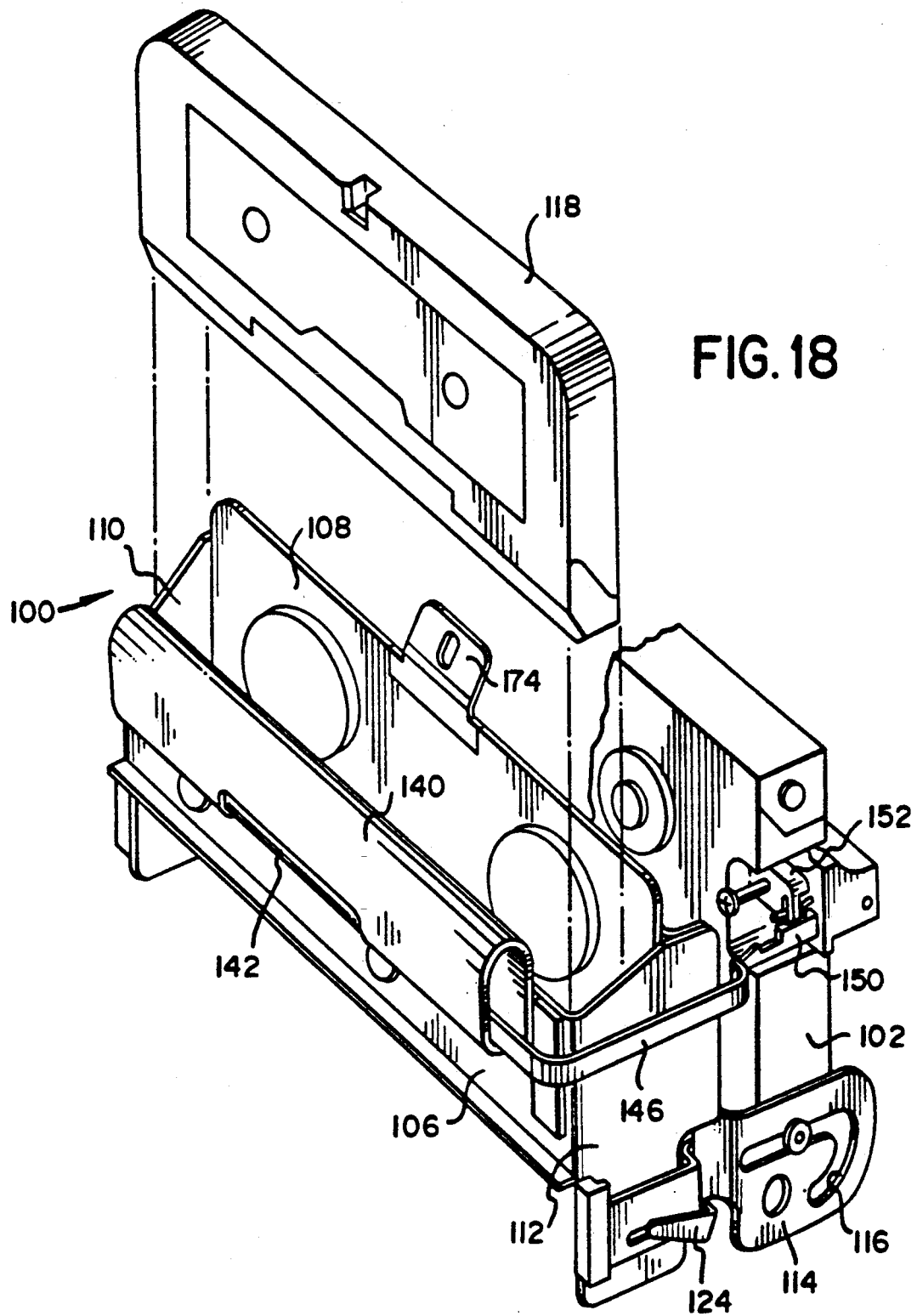
FIG. 18 is a perspective view showing loading of a cassette into the cassette loader of the present invention.
Figure 23:
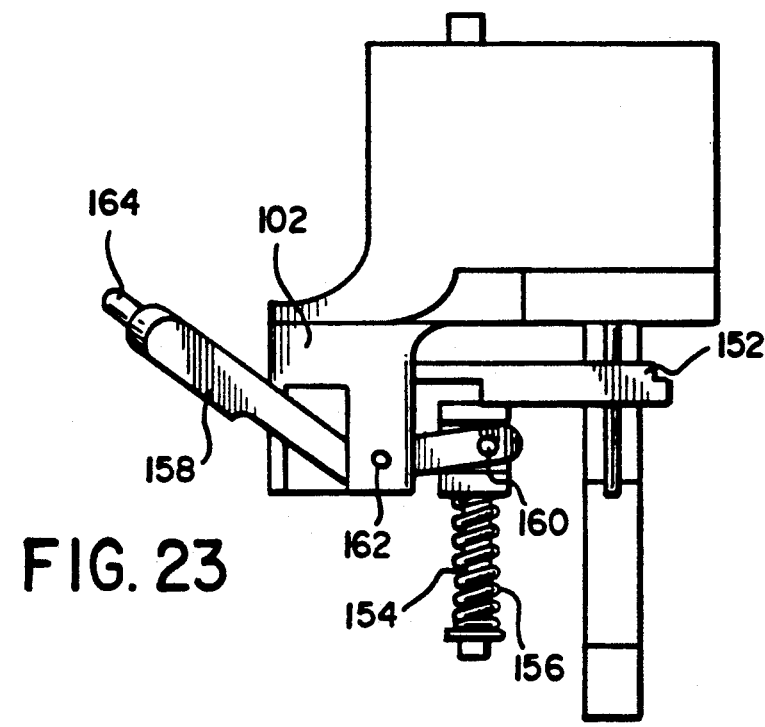
FIGS. 23 and 24 are respective plan and cross-sectional end views of the latch and interlock mechanism of the present invention.
Figure 24:
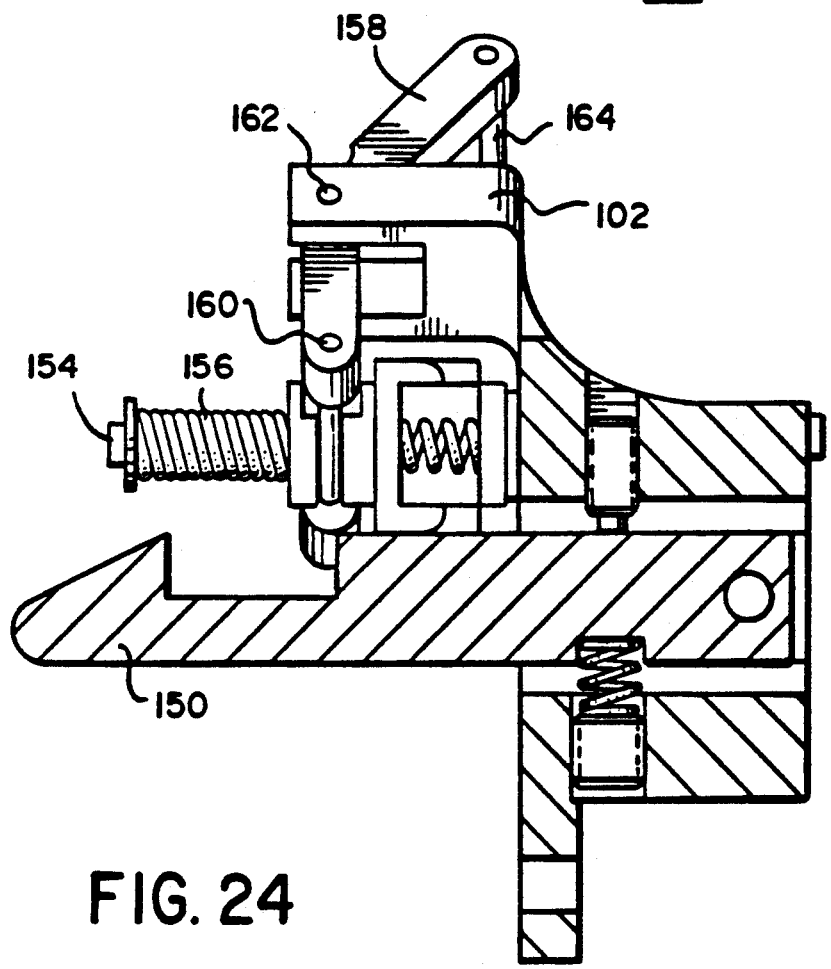
Figure 25:
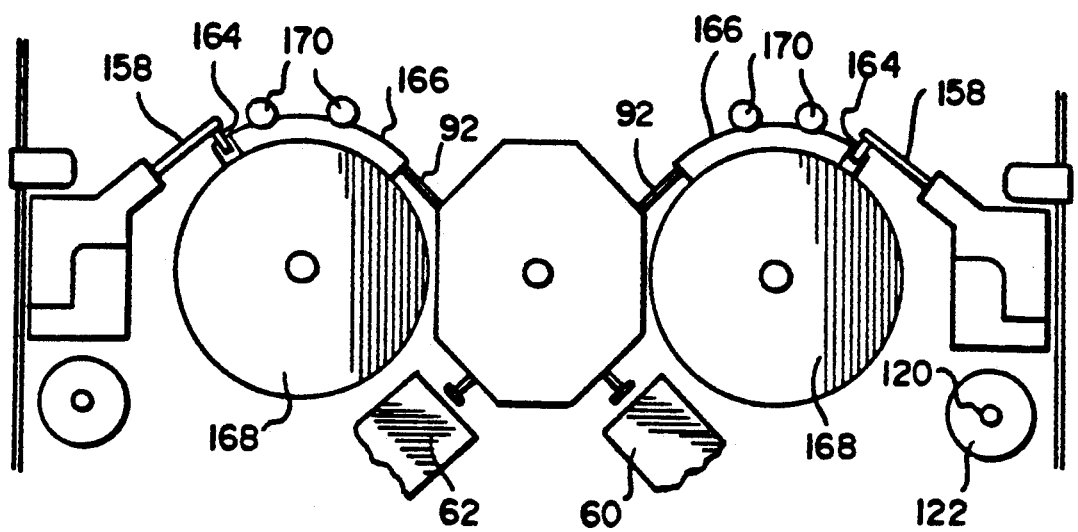
FIGS. 25 and 26 are diagrammatic views of the interlock actuating mechanism in the unactuated and actuated positions, respectively.
Figure 26:
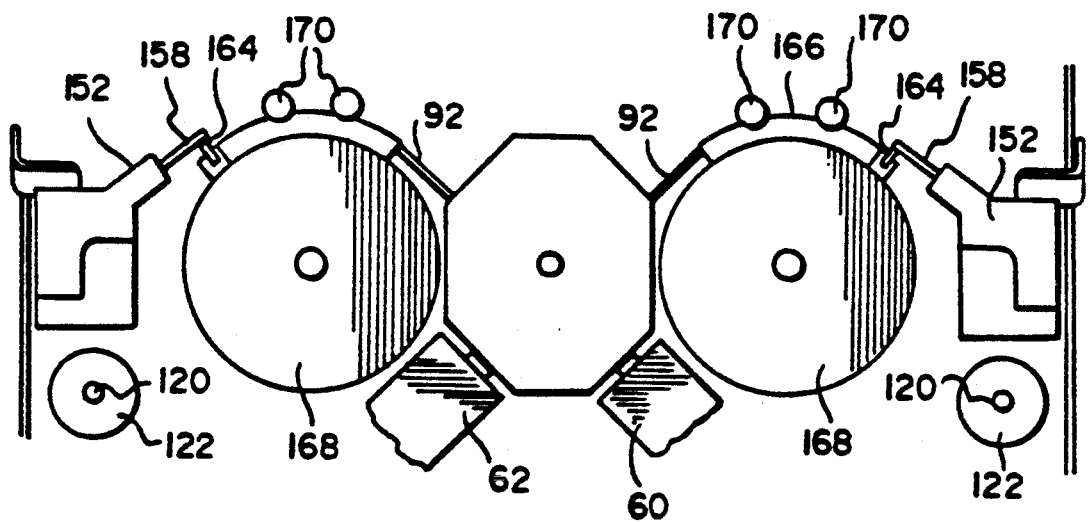

The cassette loader latch and interlock assembly according to an embodiment of the present invention will now be described. As shown in FIGS. 12-14, member 106 has a curved cover 140 containing handle 142 biased by spring 144. Integral with handle 142 are release levers 146. Side members 110 and 112 of cassette holding body 104 are provided with fixedly mounted catches 148 which engage catches 150 pivotally mounted on frame 102 (FIG. 18). As shown in FIGS. 23 and 24 the interlock assembly includes spacer 152 slidably and pivotally mounted on shaft 154. Spring 156 coiled on shaft 154 biases spacer 152. Arm 158 is connected to spacer 152 by pivot 160 and is mounted on frame 102 by pivot 162. Arm 158 has a roller 164 engaged by arcuate linkage 166 which is actuated by shaft 92. Linkage 166 is slidingly guided on reel motor housing 168 by guide rollers 170 (FIGS. 25 and 26).

Figure 22:
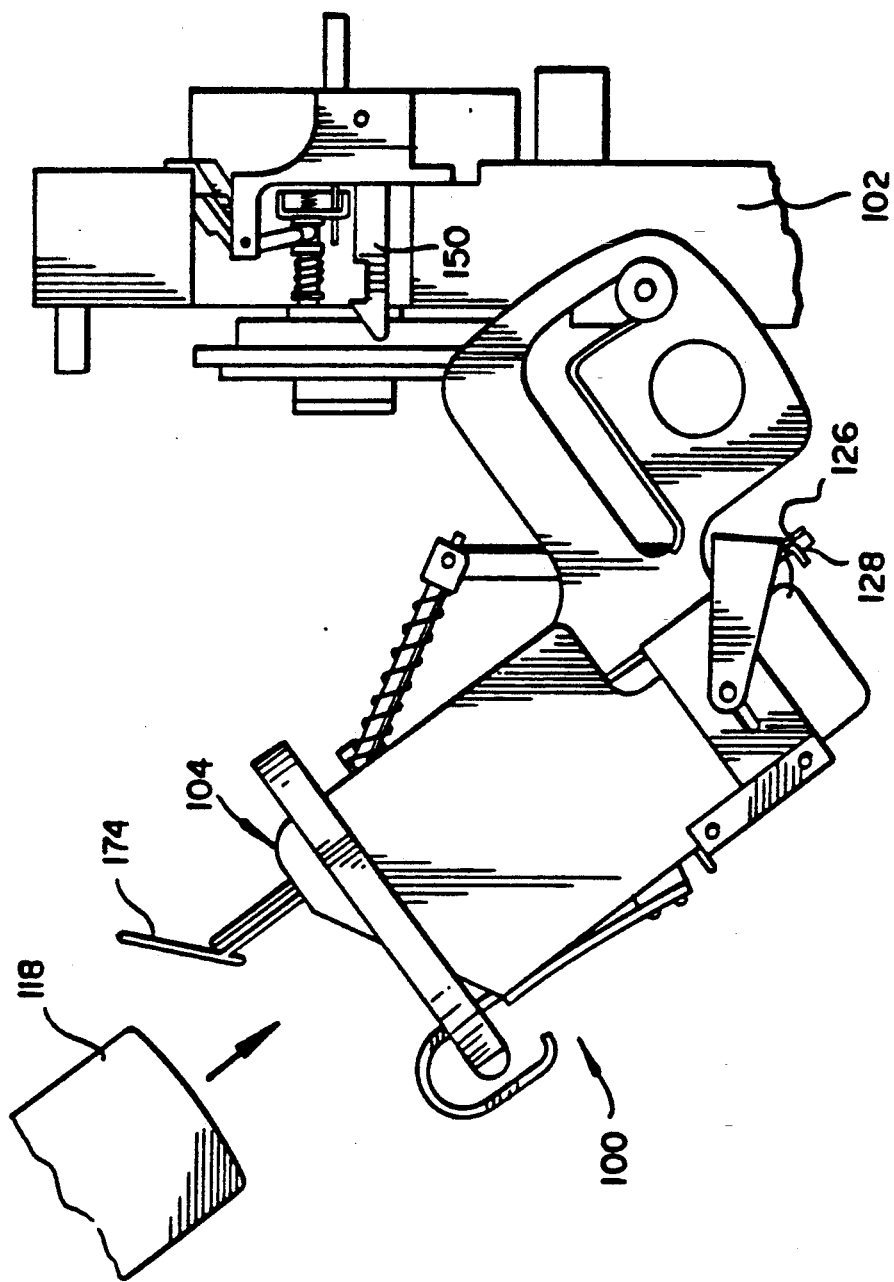

The operation of the cassette loader and interlock mechanism will now be described. It is assumed that recorder 1 is to be loaded with a magnetic tape cassette 118 in order to record or reproduce information on magnetic tape contained in the cassette 118. As shown in FIG. 22, cassette loader 100 is in the open position and cassette holding body 104 is tilted. In this position slide 126 is moved upwardly to receive cassette 118 into pocket 117 against stops 128 of slide 126. Cassette 118 is held in body 104 by spring loaded catch 174 which engages a lateral groove in cassette 118. Cassette 118 can only be loaded in one orientation or it will be stopped by pin 172 (FIG. 14) which engages a groove on cassette 118 which extends in the direction of insertion of the cassette 118.

Figure 19:
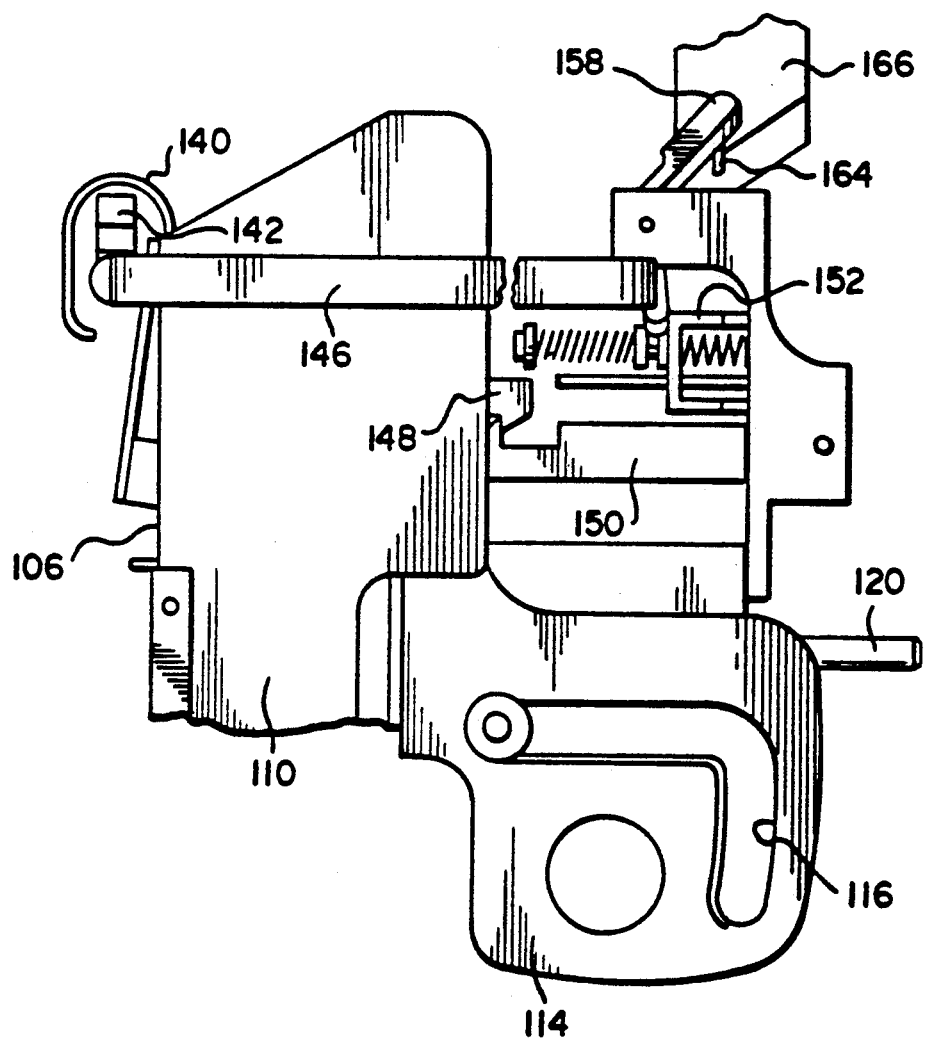
FIGS. 19, 20, 21, and 22 are diagrammatic elevational views of the handle and latch assembly respectively shown in the closed and latched position, unlatched position, almost closed and unlatched position, and open position.
Figure 20:
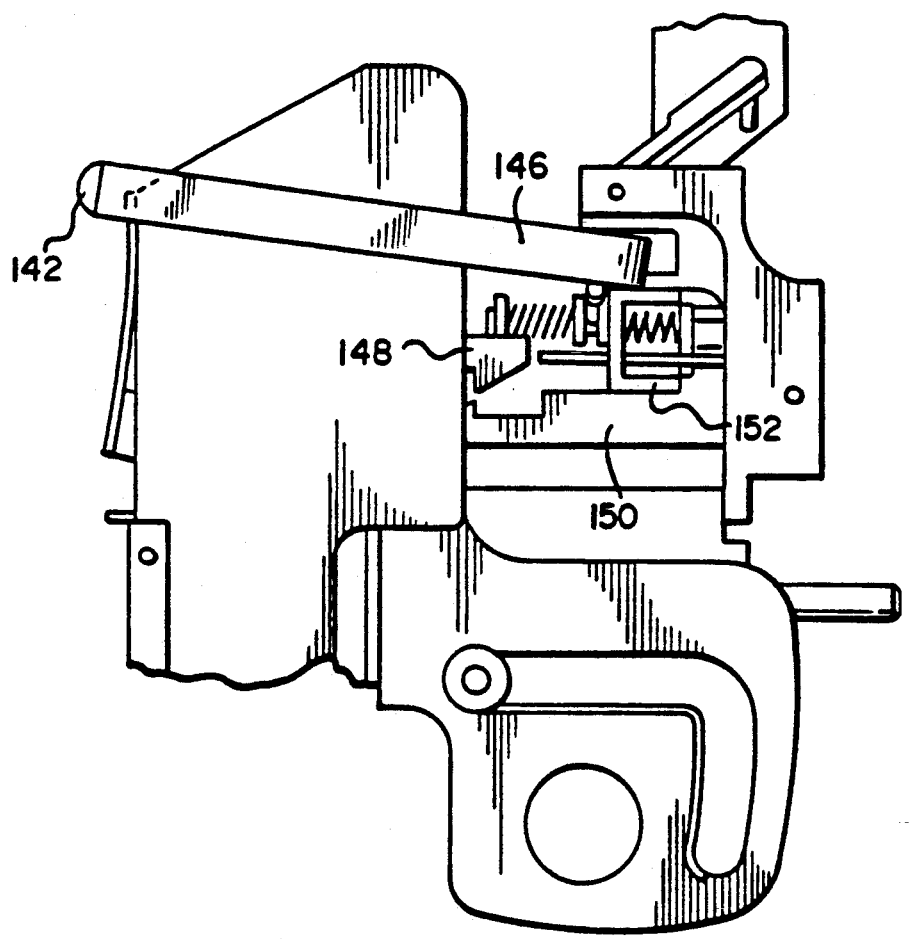
Figure 21:
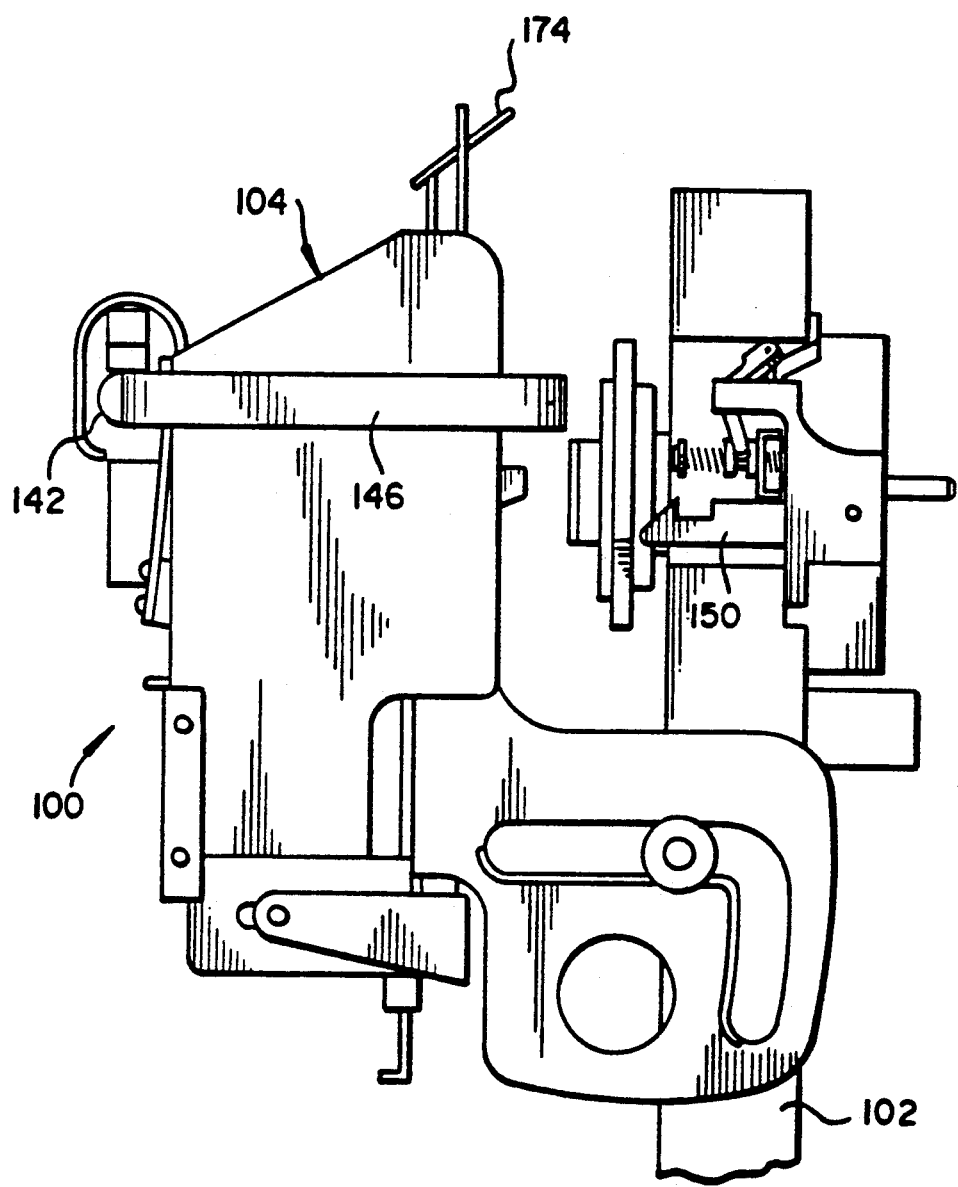

After cassette 118 is seated in pocket 117 of cassette holding body 104, the operator grasps handle assembly 140, 142 to tilt cassette holding body 104 to an upright position and to slide it towards recorder frame 102 (FIG. 21) until catches 148 engage catches 150 on frame 102 (FIGS. 20, 19). This latches holder 100 in frame 102 so that the tape threading operation described above can be initiated. When tape threading is initiated, carriages 60, 62 disengage from shafts 92. Spacers 152 are moved out of alignment with the ends of release levers 146. Thus, grasping of handle assembly 140, 142 will not effect unlocking of latch assembly 148, 150 and cassette 118 will be locked in place during recording and reproducing operations.

When the cassette 118 is to be removed from the recorder 1, the unthreading operation described above has been completed. Carriages 60,62 have returned to their start position and have engaged shafts 92 to move them from the position shown in FIG. 25 to the position shown in FIG. 26. Shafts 92 rotate arcuate linkages 166 on motor housings 168 to pivot arms 158 by means of rollers 164. Arms 158 move spacers 152 on shafts 154 from the positions shown in FIG. 19, where they are out of alignment with the ends of release levers 146, to the positions shown in FIG. 20, where they are in alignment with the ends of release levers 146.

As shown in FIG. 20, by grasping handle assembly 140, 142 levers 146 engage spacers 152 to bear on catches 150 to unlatch them from catches 148. Cassette loader 100 can then be slid out from recorder frame 102 (FIG. 21) and tilted (FIG. 22) to remove cassette 118 from loader 100.

Figure 27:
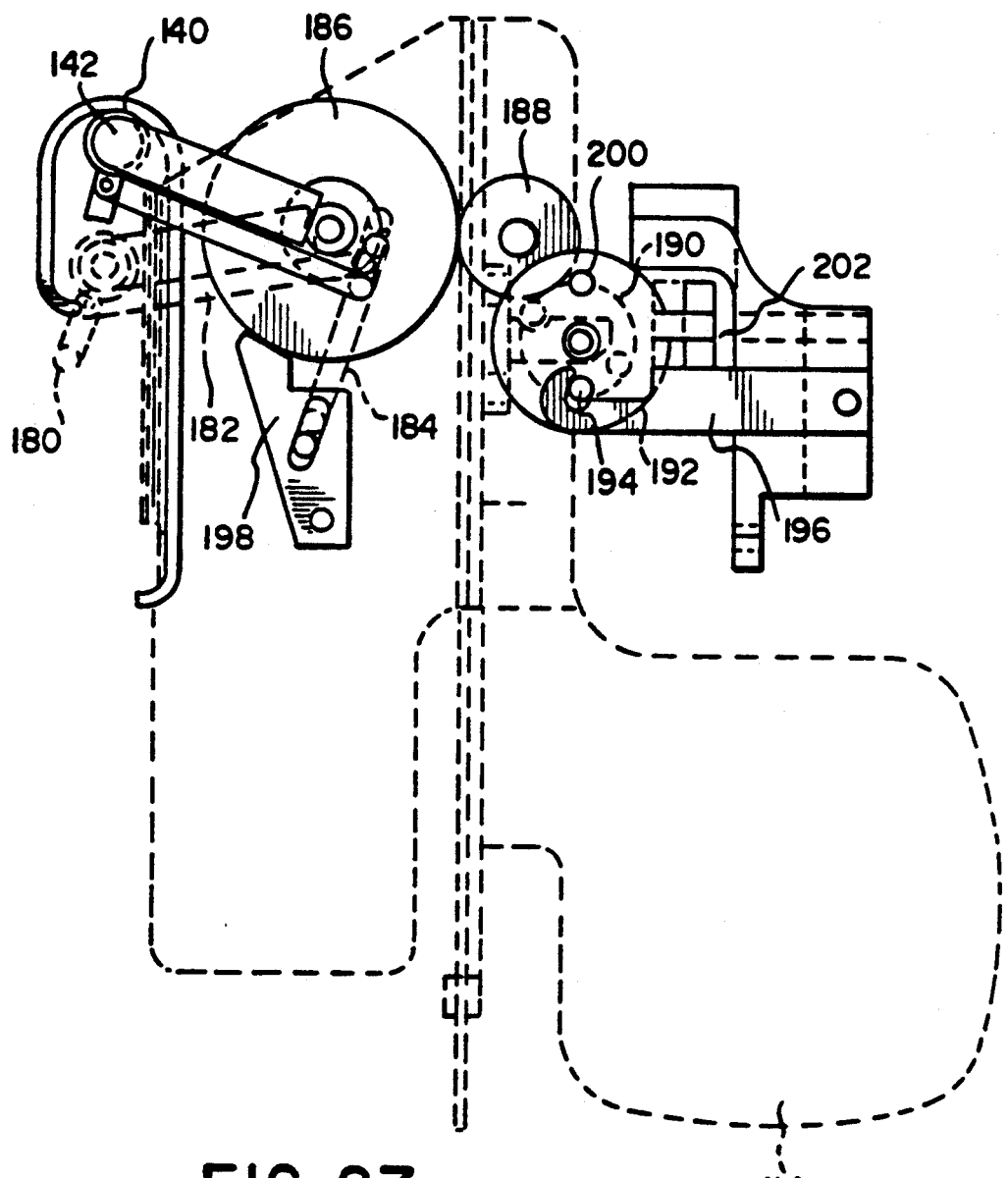
FIG. 27 is a diagrammatic view of another embodiment of latching mechanism according to the present invention.

Referring now to FIG. 27 there is shown another embodiment of interlock assembly. As shown, handle 142 is connected to a gear assembly including gears 186, 188, 190, spool 192 which mounts gear 190, spool pin 194, and catch 196. Lifting handle 140 rotates gears 186, 188, 190, and spool 192 to lock pin 194 with catch 196. A linkage assembly includes gear link bar 180, linkages 182, 184 and gear stop 198. Gear stop 198 prevents rotation of gear 186. The catch 196 is released by lifting gear link bar 180 to move gear stop 198 through linkages 182, 184 out of engagement with gear 186. Handle 140 can now be returned to the open position rotating gears 186, 188, 190, and spool 192 to disengage spool pin 194 from catch 196. Stop pin 200 on spool 192 limits the rotation of spool 192. A stop link 202 is also provided.

The invention has been described in detail with reference to the figures, however, it will be understood that variations and modifications are possible within the spirit and scope of the invention.

What is claimed is:

1. A magnetic tape cassette recorder comprising:
    a recorder frame;
    magnetic tape cassette holding means for releasably holding a magnetic tape cassette;
    mounting means on said recorder frame for slidably mounting said magnetic tape cassette holding means for linear sliding movement between a first position spaced from said frame and a second position within said frame, said mounting means including means for tilting said holding means, relative to said linear sliding movement when in said first position for facilitating insertion and removal of a magnetic tape cassette with respect to said cassette holding means;
    cooperative latch means on said recorder frame and on said holding means for latching said holding means in said recorder frame when said holding means is in said second position;
    interlock means coupled to said latch means for selectively locking and unlocking said latch means; and
    wherein said recorder includes tape threading means mounted on said recorder frame for removing tape from a cassette held by said holding means at said second position within said frame, wherein said threading means (a) deactuates said interlock means to lock said latch means to prevent movement of said cassette holding means from said second position when said threading means has been actuated and removed tape from a cassette, and (b) actuates said interlock means to unlock said latch means to allow movement of said cassette holding means from said second position when said threading means has been deactuated and tape is returned to said cassette.

2. The recorder of claim 1 including handle means on said holding means and coupled to said latch means for selectively moving said holding means between said first and second positions and for selectively actuating said latch means when said holding means is in said second position; wherein when said interlock means selectively locks said latch means, said handle means is prevented from actuating said latch means.

3. The recorder of claim 1 wherein said magnetic tape cassette holding means includes front, back and side members which form a pocket for holding a magnetic tape cassette, a slide slidably supported in said pocket for engaging a held cassette, wherein said tilting means is coupled to said slide such that when said holding means is in said first position and said holding means is tilted by said tilting means, said slide is slid relative to said holding means to facilitate insertion and removal of a cassette with respect to said holding means.

4. The recorder of claim 2 wherein said latch means includes a first hook like catch fixedly mounted on said recorder frame and a second hook like catch pivotally mounted on said holding means for engaging said first catch and wherein said handle means includes a spring biased handle and a release lever connected to said handle which is engagable with said pivotally mounted second catch to disengage said second catch from said first catch.

5. The recorder of claim 2 wherein said latch means includes a hook like catch fixedly mounted on said recorder frame, a catch pin rotatably mounted on said cassette holding means for engaging said catch, and wherein said handle means includes a spring biased handle and a gear train coupled between said handle and said rotatably mounted catch pin, such that actuation of said handle rotates said catch pin through said gear train to disengage said catch pin from said catch.

* * * * *